(12) United States Patent
Penth et al.

(10) Patent No.: US 9,901,893 B2
(45) Date of Patent: Feb. 27, 2018

(54) APPARATUS AND METHOD FOR PRODUCING DISPERSIONS AND SOLIDS

(71) Applicants: Instillo GmbH, Saarlouis (DE); Elfie Penth, Lebach (DE)

(72) Inventors: Bernd Penth, Lebach (DE); Felix Penth, Lebach (DE); Bernd Baumstuemmler, Saarlouis (DE); Akif Emre Tuereli, Saarlouis (DE)

(73) Assignee: Instillo GmbH, Saarlouis (DE)

( * ) Notice: Subject to any disclaimer, the term of this patent is extended or adjusted under 35 U.S.C. 154(b) by 200 days.

(21) Appl. No.: 14/779,604

(22) PCT Filed: Mar. 28, 2014

(86) PCT No.: PCT/DE2014/100109
§ 371 (c)(1),
(2) Date: Sep. 24, 2015

(87) PCT Pub. No.: WO2014/154209
PCT Pub. Date: Oct. 2, 2014

(65) Prior Publication Data
US 2016/0051956 A1 Feb. 25, 2016

(30) Foreign Application Priority Data

Mar. 28, 2013 (DE) .................. 10 2013 005 359
Jul. 15, 2013 (DE) .................. 10 2013 011 724

(51) Int. Cl.
*B01J 13/00* (2006.01)
*B01F 5/02* (2006.01)
(Continued)

(52) U.S. Cl.
CPC ........ *B01J 13/0095* (2013.01); *B01D 9/0027* (2013.01); *B01D 9/0054* (2013.01);
(Continued)

(58) Field of Classification Search
None
See application file for complete search history.

(56) References Cited

U.S. PATENT DOCUMENTS

| 4,702,799 A | 10/1987 | Tuot |
| 5,092,959 A | 3/1992 | Orii et al. |

(Continued)

FOREIGN PATENT DOCUMENTS

| CA | 2 628 562 A1 | 5/2007 |
| DE | 40 28 341 A1 | 10/1991 |

(Continued)

OTHER PUBLICATIONS

International Search Report of PCT/DE2014/100109, dated Aug. 6, 2014.

(Continued)

*Primary Examiner* — Mary Lynn F Theisen
(74) *Attorney, Agent, or Firm* — Collard & Roe, P.C.

(57) ABSTRACT

The invention relates to an apparatus and method for the production of dispersions and solids by way of controlled precipitation, co-precipitation and self-organization processes in a microjet reactor, a jet of solvent containing at least one target molecule and a jet of nonsolvent colliding with each other, at specified pressures and flow rates, at a collision point in the reactor chamber of the microjet reactor, and the microjet reactor having a gas inlet for introducing gas into the reactor chamber and an educt outlet for discharging the educts in a stream of gas. This results in very rapid precipitation, co-precipitation or a chemical reaction, during the course of which micro- or nanoparticles form.
In order to create an apparatus with which solvent/nonsolvent precipitations may be carried out in such a way as to produce particles that are as small as possible and largely free of Ostwald ripening in the dispersion being formed, it is suggested according to the invention that the educt outlet (Continued)

be followed by a spray-drier unit and that a feedback control system be provided to optimize and maintain the operating parameters for the spray-drier unit.

12 Claims, 1 Drawing Sheet

(51) Int. Cl.
*B01D 1/18* (2006.01)
*A61K 9/14* (2006.01)
*B01D 9/00* (2006.01)
*B01J 2/04* (2006.01)
*F26B 3/12* (2006.01)

(52) U.S. Cl.
CPC .............. *B01F 5/0256* (2013.01); *B01J 2/04* (2013.01); *F26B 3/12* (2013.01); *F26B 2210/12* (2013.01)

(56) References Cited

U.S. PATENT DOCUMENTS

| | | |
|---|---|---|
| 5,118,529 A | 6/1992 | Klinedinst |
| 5,534,270 A | 7/1996 | De Castro |
| 5,833,891 A | 11/1998 | Subramaniam et al. |
| 6,177,103 B1 | 1/2001 | Pace et al. |
| 6,862,890 B2 | 3/2005 | Williams, III et al. |
| 8,697,131 B2 | 4/2014 | Tuereli et al. |
| 8,852,644 B2 | 10/2014 | Baumstuemmler et al. |
| 2004/0139908 A1 | 7/2004 | Bowe et al. |
| 2006/0002862 A1 | 1/2006 | Truong-Le et al. |
| 2009/0214655 A1 | 8/2009 | Ganan Calvo et al. |
| 2012/0263012 A1* | 10/2012 | Xiong .................. B01F 5/0256 366/134 |
| 2013/0012551 A1* | 1/2013 | Baumstuemmler ........ B01J 2/04 514/356 |
| 2014/0284001 A1* | 9/2014 | Amstad .................... F26B 3/12 159/4.01 |

FOREIGN PATENT DOCUMENTS

| | | |
|---|---|---|
| DE | 10 2005 017 777 A1 | 10/2006 |
| DE | 10 2005 053 862 A1 | 5/2007 |
| DE | 10 2009 008 478 A1 | 8/2010 |
| EP | 1 165 224 B1 | 1/2002 |
| EP | 2 550 092 A1 | 1/2013 |
| JP | 2008-182911 A | 8/2008 |
| WO | 02/60275 A1 | 8/2002 |

OTHER PUBLICATIONS

International Preliminary Report on Patentability in PCT/DE2014/100109, dated Nov. 26, 2015.

* cited by examiner

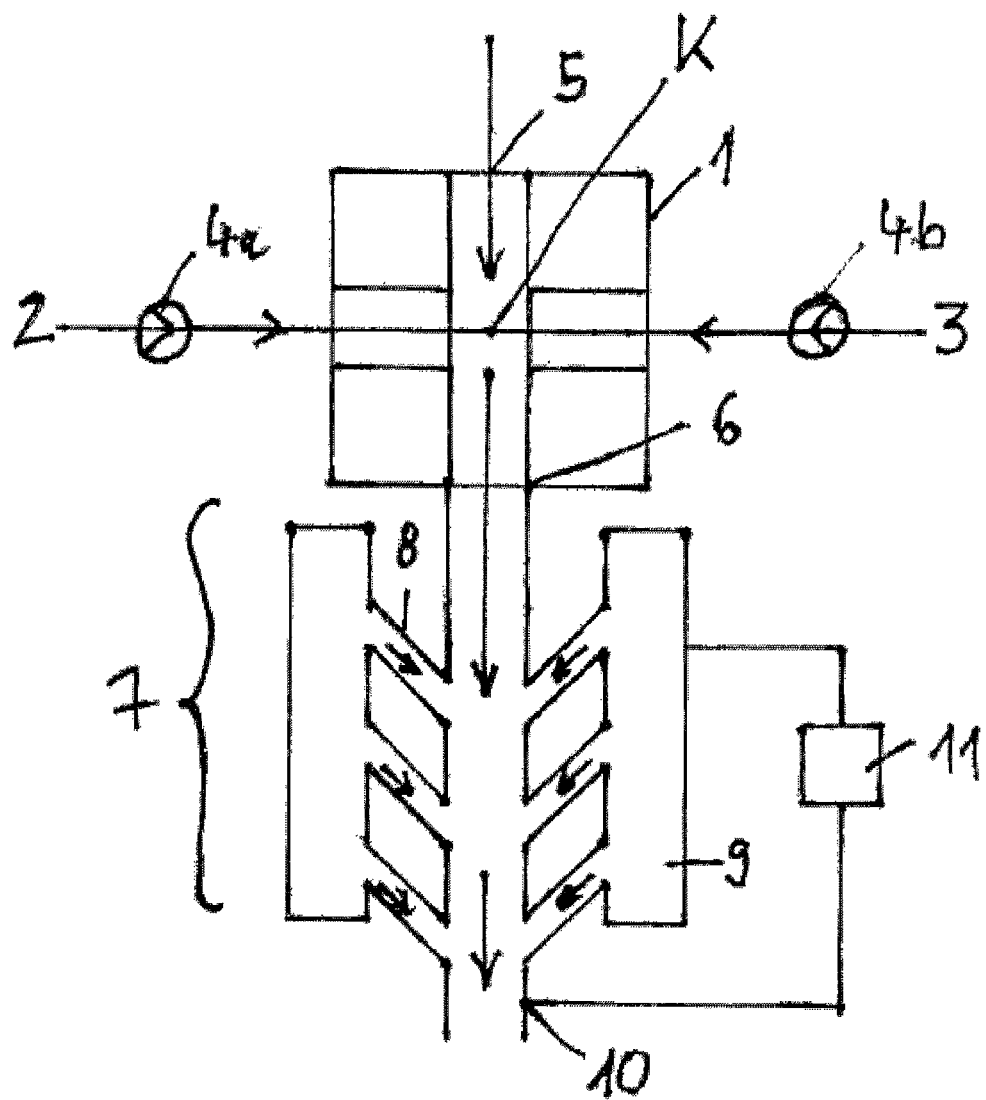

APPARATUS AND METHOD FOR PRODUCING DISPERSIONS AND SOLIDS

CROSS REFERENCE TO RELATED APPLICATIONS

This application is the National Stage of PCT/DE2014/100109 filed on Mar. 28, 2014, which claims priority under 35 U.S.C. § 119 of German Application Nos. 10 2013 005 359.5 filed on Mar. 28, 2013 and 10 2013 011 724.0 dated Jul. 15, 2013, the disclosures of which are incorporated by reference. The international application under PCT article 21(2) was not published in English.

The invention relates to an apparatus, comprising a microjet reactor and a spray-dryer unit, for producing dispersions and solids by way of controlled precipitation, co-precipitation and self-organization processes, the microjet reactor being configured such that it has at least two mutually opposite nozzles, each with its own pump and feed line for injecting a liquid medium into a reactor chamber enclosed in a reactor housing and onto a common collision point, and the microjet reactor having a gas inlet for introducing gas into the reactor chamber and an educt outlet for discharging the educts in a stream of gas. This results in very rapid precipitation, co-precipitation or a chemical reaction, during the course of which micro- or nanoparticles form.

The invention also relates to a method of producing dispersions and solids by way of controlled precipitation, co-precipitation and self-organization processes in a microjet reactor, the microjet reactor being configured such that a jet of solvent containing at least one target molecule and a jet of non-solvent are injected, through two mutually opposite nozzles, into the reactor chamber of the microjet reactor at specified pressures and flow rates and collide at a collision point in a reactor chamber enclosed in a reactor housing, gas being introduced into said reactor chamber via a gas inlet and the educts being discharged through an educt outlet in a stream of gas.

In numerous branches of industry, in particular in the medical and pharmaceutical fields, there is a frequent need to micronize or nanosize large particles. These methods are being used increasingly often, particularly in the pharmaceutical field, to enhance the bioavailability of active ingredients or to deliver one or more active ingredients to a targeted site of action.

The term bioavailability refers to the degree to which an active ingredient, following administration thereof, can be made available to the targeted tissue. Many factors are known to influence bioavailability, for example, a substance's solubility in water, it's release rate or particle size. Micronizing or nanosizing substances that dissolve poorly in water thus enhances their bioavailability, either by improving their solubility or increasing their release rate.

Another method of enhancing bioavailability is via drug targeting or drug delivery, whereby particles are distributed in the target tissue according to their size or are engineered such as to have suitable surface modifications enabling them to reach the targeted site of absorption or action.

Such methods of producing microparticles and nanoparticles are described in various patent applications and patents, for example in U.S. Pat. No. 5,833,891 A, U.S. Pat. No. 5,534,270 A, U.S. Pat. No. 6,862,890 B, U.S. Pat. No. 6,177,103 B, DE 10 2005 017 777 A1 and DE 10 2005 053 862 A1.

WO 02/60275 A1 describes methods of producing nanoparticles in which two immiscible liquids are charged electrically so as to achieve encapsulation. In this case, the use of toxic substances is not ruled out, meaning that product quality may suffer considerably as a result. Particle size, moreover, cannot be controlled with this method.

U.S. 2009/0214655 A1 also describes the use of two immiscible liquids. Although a microreactor is used there to produce the nanoparticles, only the production of emulsions is described. In addition, the nanoparticles are produced in a liquid-filled space in which, once again, it is impossible to control either particle size or the particle properties. Furthermore, the device can easily become blocked due to the fact that the reactions are carried out in micro channels.

The known techniques for producing nanoparticles have many disadvantages.

"Top-down" techniques, most of which involve mechanical crushing processes such as dry or wet milling, run the risk of microbial contamination, contamination from milling-ball abrasion or degradation of the active ingredient, particularly since very lengthy milling times are needed to micronize the active ingredient. In the case of dry milling, moreover, the smallest obtainable particle size even after very lengthy milling times is still approx. 100 micrometers.

A number of "bottom-up" approaches exist for the production of nanoparticles, such as salting out, emulsification, solvent evaporation or spray vaporisation of supercritical liquids.

No matter which of these approaches is used to produce pharmaceutical nanoparticles, an increase in surface area compared to that of particles exceeding 1 µm in size will always be obtained.

The increase in surface area and in surface interactions may positively influence the release rate and make it possible to control the pharmacokinetic properties of a drug. Most of these methods, nevertheless, have the following limitations: high energy input; low level of success; upscaling problems (transition from laboratory experiment to industrial-scale production); particle size and properties are difficult to control; relatively toxic organic solvents have to be used or the methods themselves are difficult to carry out. These factors limit the use of these methods for the commercial production of nanoparticles.

As one of the various methods mentioned, the nanoprecipitation or solvent-exchange method was described in U.S. Pat. No. 5,118,529 A. This relatively simple method includes the formation of nanoparticles by means of solvent/nonsolvent precipitation in a single step. Ideally, the polymer and the active ingredient are dissolved in the same solvent so as to be precipitated as nanoparticles on contact with the nonsolvent (usually water).

The rapid formation of nanoparticles is caused by the Marangoni effect as a result of eddies at the solvent/nonsolvent collision point and of diffusion of solvent into the nonsolvent.

Precipitation results in the production of nanoparticles measuring 100 to 300 nm and showing relatively narrow particle distribution when various polymers are used. Surface modifiers are not required in all cases. Normally, use is made only of non-toxic solvents.

The described prior art discloses that, especially in the pharmaceutical industry, novel methods are needed that avoid all the disadvantages connected with the conventional methods outlined above.

DE 10 2009 008 478 A1 describes a method in which solvent/anti-solvent precipitation with in-situ spray drying occurs in the presence of surface-active molecules. A microjet reactor of the kind described in EP 1 165 224 B1 is used here. A microjet reactor of this kind has at least two mutually opposite nozzles, each of which has its own pump and feed line for injecting a liquid medium into a reactor chamber enclosed in a reactor housing and onto a shared collision point, the reactor housing being provided with a first opening through which a gas, an evaporating liquid, a cooling liquid or a cooling gas can be introduced so as to maintain the gaseous atmosphere within the reactor, notably at the collision point of the two liquid jets, and to cool the resulting products, and a further opening for removing the resulting products and excess gas out of the reactor housing. Accordingly, a gas, an evaporating liquid or a cooling gas is introduced via an opening into the reactor chamber so as to maintain a gaseous atmosphere within the reactor, notably at the collision point of the two liquid jets, and to cool the resulting products, and the resulting products together with excess gas are removed from the reactor housing through an opening by positive pressure on the gas input side or negative pressure on the product- and gas-discharge side. If a solvent/nonsolvent precipitation is carried out in a microjet reactor of the kind described in EP 2 550 092 A1, for example, one obtains a dispersion of the precipitated particles. A reactor of this kind makes it possible to generate especially small particles. In this context, the expression "solvent/nonsolvent precipitation" means that a substance is dissolved in a solvent and, in the form of a liquid jet, collides with a second liquid jet, whereupon the dissolved substance is precipitated again. A disadvantage of solvent/nonsolvent precipitations is the fact that the substance that is dissolved and then precipitated again is present, following precipitation, in particulate form in the solvent/nonsolvent mixture. The solvent fraction causes many particles to undergo time-dependent Ostwald ripening, with the effect that particle size increases.

It is accordingly often difficult to control particle size in dispersions obtained via solvent/nonsolvent precipitations, and, in particular, to prevent the time-dependent increase in particle size.

In DE 10 2009 008 478 A1, the active ingredient and a surface-active molecule are dissolved in a water-miscible organic phase. This organic solution and water, which serves as nonsolvent, are pumped, each through a dedicated stainless steel capillary and at a constant flow rate and pressure, by two pumps into the microreactor (referred to as the "microjet reactor"), where they collide as "impinging jets" (jets that collide head-on). Within the reactor, solvent and nonsolvent are mixed very rapidly, the active ingredient precipitating out as nanoparticles and the resulting nanoparticle suspension being expelled from the microjet reactor either by very hot compressed air or an inert gas.

The gas vaporizes the organic solvent and the water to the effect that, after both liquid phases have vaporized, the nanoparticles of active ingredient are coated with the surface-modifying molecules. At the end of the process the nanoparticles are in powder-form.

The essential element in DE 10 2009 008 478 A1 is thus the use of heated air or an inert gas, together with a surface modifier, in such a manner that the solvent and the nonsolvent vaporize as the active ingredient precipitates and the surface modifiers coat the nanoparticles, thereby preventing further aggregation of the particles and Ostwald growth.

Although particle size can be efficiently controlled with the method described in DE 10 2009 008 478 A1, the necessity of using surface modifiers constitutes a constraint on the use of this technology for diverse microparticle or nanoparticle production strategies.

US 2013/0012551 A1 describes how particle size is influenced in a method for producing microparticles or nanoparticles of water-soluble and water-insoluble substances by controlled precipitation, co-precipitation and self-organization processes in microjet reactors.

US 2004/0139908 A1 relates to the production of small crystals by mixing a solution of the desired substance with an anti-solvent in a vortex mixer with a short residence time.

Spray driers are widely used tools for the production of solids from solutions by means of solvent evaporation, and are known from DE 40 28 341 A1, for example. Spray driers themselves can be used to concentrate solutions or dispersions, or to process them to dry matter, but not to carry out solvent/nonsolvent precipitations.

The object of the present invention consists in creating an apparatus for carrying out solvent/nonsolvent precipitations in such a way as to produce particles that are as small as possible and largely free of Ostwald ripening in the dispersion being formed.

This object is established with the apparatus according to the invention in that the educt outlet is followed immediately by a spray-drier unit configured as a length of piping connected to the educt outlet of the microjet reactor and supplied from the side with one or more streams of air or inert gas, and that a feedback control system is provided to optimize and maintain the operating parameters for the spray-drier unit.

In accordance with its mode of operation, the microjet reactor generates an aerosol/air stream, the aerosol droplets consisting of a solvent/nonsolvent mixture and, dispersed therein, freshly precipitated particles. Immediately after the aerosol exits the microjet reactor, the age of the precipitated particles is less than 100 ms.

The aerosol is blown with the through-flowing gas into the adjoining spray-drier unit, i.e. the vaporiser section with its lateral infeed of gas heated to a performance-related temperature. Thus, after exiting reactor, the aerosol/air stream flows immediately into the spray-drier unit.

The spray-drier unit consists of a length of piping supplied from the side with one or more quantity- or temperature-controlled stream(s) of air or inert gas. This stream of gas preferentially entrains the easily vaporised solvent fractions of the aerosol droplets, meaning that the easily vaporised solvent vaporises out of the aerosol droplets. The remaining aerosol is obtained as a stable and fine dispersion, with a particle size of mostly below 1 μm.

The decrease in the solvent fraction of the solvent/nonsolvent mixture reduces the aerosol droplets' dissolving power for the precipitated particles to such an extent as to stop Ostwald ripening. At the end of the length of piping, where the stream of gas is saturated, the temperature is measured for control purposes.

By virtue of the method used in the microjet reactor, whereby the solvent and nonsolvent jets collide under elevated pressure, the size of the aerosol droplets is usually less than 100 μm, the exact size depending on the system and the operating parameters, in particular the size of the nozzles in the microjet reactor and the pump pressure of the pumps delivering solvent and nonsolvent. Smallish nozzle sizes, for example 50 μm or 100 μm, and highish pressures, for example 10 bar to 100 bar, produce finer aerosol droplets, as do highish carrier-gas airflow rates in the microjet reactor, for example 30 l/min.

The feedback control system serves to optimise and maintain the operating parameters, in particular to regulate the volumetric flow rate and temperature of the aerosol/gas stream. The amount of heat energy introduced into the stream of air or inert gas fed into the spray-drier unit from the side, and thus the temperature of the stream of air or inert gas and/or the volumetric flow rate thereof, is regulated via measurement of the temperature, as a controlled variable, at the end of the length of piping constituting the spray-drier unit. The stream of aerosol cools down as the solvent and usually some of the nonsolvent vaporises and heat of vaporisation is removed from the aerosol. If the stream of aerosol cools down too much, solvent vaporisation decreases. If the stream of aerosol is heated too strongly, the particles are obtained as solids or are even destroyed thermally.

The controlled supply of heated gas to the spray-drier unit is independent of the supply (inherent to the microjet reactor) of mostly non-heated gas to the microjet reactor.

It is within the scope of the invention for the spray-drier unit to include means for heating the stream of air or inert gas.

In this context, the invention provides for the temperature of the stream of air or inert gas to be controllable via the feedback control system.

Alternatively or in addition, provision may be made for the volumetric flow rate of the stream of air or inert gas to be controllable via the feedback control system.

It is within the scope of the invention for the jets of solvent and nonsolvent to collide with each other at an angle of 90 to 180° C., an angle of 180° C. being preferred.

The object is also established with a method of producing dispersions and solids by way of controlled precipitation, co-precipitation and self-organisation processes in a microjet reactor, a jet of solvent containing at least one target molecule and a jet of nonsolvent colliding, at specified pressures and flow rates, at a collision point in the reactor chamber of the microjet reactor, said microjet reactor having a gas inlet for introducing gas into the reactor chamber and an educt outlet for discharging the educts in a stream of gas, and said educts exiting from the educt outlet passing through a spray-drier unit the operating parameters of which are controlled via a feedback control system.

In this connection, the invention provides for the spray-drier unit to be configured as a length of piping into which one or more streams of air or inert gas are supplied from the side.

It is possible to regulate either the temperature or the volumetric flow rate of the stream(s) of air or inert gas by measuring the temperature, as controlled variable, at the end of the length of piping constituting the spray-drier unit. It is also possible to combine the two procedures.

It is preferable if spray-drying is only continued long enough to concentrate the dispersion but not to dry it. Accordingly, only some of the solvent/nonsolvent mixture vaporizes. The solvent and nonsolvent are preferably selected such that the solvent has the higher saturation pressure and therefore vaporizes with preference. This means that, following the concentration process, the solvent has been largely removed from the dispersion and Ostwald ripening thereby at least considerably reduced.

An alternative option is to continue spray-drying until the dispersion is, for the most part, completely dry. Agglomeration may be prevented by using substance-specific prior-art auxiliaries.

Finally, it is within the scope of the invention to separate solvent-saturated gas from the dispersion being formed.

An embodiment of the invention is explained below by reference to a drawing.

The drawing in

FIG. 1 is a schematic diagram of an apparatus according to the invention.

In the reactor chamber 1 of a microjet reactor, a jet of a solvent 2 containing at least one target molecule and a jet of a nonsolvent 3, said solvents being delivered by high-pressure pumps 4a and 4b, respectively, exit nozzles and collide with each other at a collision point K. The jets of solvent 2 and nonsolvent 3 are injected into the reactor chamber at pressures in excess of 50 bar, preferably in excess of 500 bar and even more preferably at pressures of 1,000 to 4,000 bar. The reactor chamber 1 of the microjet reactor also features a gas inlet 5 for introducing gas into the reactor chamber 1 and an educt outlet 6 for discharging the educts in a stream of gas, said gas inlet 5 and educt outlet 6 being disposed at right angles to the direction of the jets of solvent 2 and nonsolvent 3. The jets of solvent 2 and nonsolvent 3 collide at an angle of 180°.

The educt outlet 6 is followed immediately by a spray-drier unit 7 configured as a length of piping connected to the educt outlet 6 and supplied from the side, via infeed channels 8, with one or more streams of air or inert gas. These streams of air or inert gas are heated beforehand in means 9 for heating the stream(s) of air or inert gas.

A feedback control system is also provided to optimise and maintain the operating parameters for the spray-drier unit 7. A thermocouple 10 is provided at the end of the length of piping constituting the spray-drier unit 7 and is used to measure the temperature of the educt/gas stream at the end of the length of piping constituting the spray-drier unit 7. This temperature serves as the controlled variable. The thermal output of the means 9 for heating the stream(s) of air or inert gas, and thus the temperature of the stream of air or inert gas, and/or the delivery rate of the means 9 for heating the stream(s) of air or inert gas, and thus the volumetric flow rate of the stream of air or inert gas, are regulated, via a feedback control system 11, as a function of the temperature at the end of the length of piping constituting the spray-drier unit in such a manner that optimal operating parameters prevail at any one time and particles are obtained that are as small as possible and largely free of Ostwald ripening in the dispersion being formed.

If possible, the solvent and nonsolvent are selected such that the solvent has the higher vapour pressure and therefore vaporises with preference. The decrease in the solvent fraction of the solvent/nonsolvent mixture reduces the aerosol droplets' dissolving power for the precipitated particles to such an extent as to stop Ostwald ripening or at least considerably reduce it.

The stream of aerosol cools down as the solvent and usually some of the nonsolvent vaporises and heat of vaporisation is removed from the aerosol. If the stream of aerosol cools down too much, solvent vaporisation decreases. If the stream of aerosol is heated too strongly, the particles are obtained as solids or are even destroyed thermally. The feedback control system ensures that the temperature of the aerosol stream is optimal.

It is possible either to continue spray-drying long enough to concentrate the dispersion but not to dry it or to continue spray drying until the dispersion is, for the most part, completely dry.

The invention claimed is:

1. An apparatus, comprising
a microjet reactor and a spray-drier unit, for producing dispersions and solids by way of controlled precipitation, co-precipitation and self-organization processes,
the microjet reactor being configured such that it has at least two mutually opposite nozzles, each with its own pump and feed line for injecting a liquid medium into a reactor chamber enclosed in a reactor housing and onto a common collision point (K), the microjet reactor having a gas inlet (5) for introducing gas into the reactor chamber (1) and an educt outlet (6) for discharging the educts in a stream of gas, wherein the educt outlet (6) is followed immediately by a spray-drier unit (7) configured as a length of piping connected to the educt outlet (6) of the microjet reactor and being supplied from the side with one or more streams of air or inert gas, and wherein a feedback control system (11) is provided to optimize and maintain the operating parameters for the spray-drier unit (7).

2. The apparatus according to claim 1, wherein the spray-dryer unit (7) includes means (9) for heating the stream of air or inert gas.

3. The apparatus according to claim 1, wherein the temperature of the stream of air or inert gas is controllable via the feedback control system (11).

4. The apparatus according to claim 1, wherein the volumetric flow rate of the stream of air or inert gas is controllable via the feedback control system (11).

5. The apparatus according to claim 1, wherein jets of solvent (2) and nonsolvent (3) collide with each other at an angle of 90° to 180°.

6. A method of producing dispersions and solids by way of controlled precipitation, co-precipitation and self-organization processes in a microjet reactor, comprising the steps of:

configuring the microjet reactor such that a jet of solvent (2) containing at least one target molecule and a jet of nonsolvent (3) are injected, through two mutually opposite nozzles, into the reactor' chamber (1) of the microjet reactor at specified pressures and flow rates and collide at a collision point (K) in a reactor chamber enclosed in a reactor housing, introducing gas into said reactor chamber (1) via a gas inlet (5) and the educts being discharged through an educt outlet (6) in a stream of gas, having the educts exiting from the educt outlet (6) pass through a spray-drier unit (7) configured as a length of piping supplied from the side with one or more streams of air or inert gas, and controlling the operating parameters for the spray-drier unit (7) via a feedback control system (11).

7. The method according to claim 6, wherein the temperature of the stream(s) of air or inert gas is controlled by measuring the temperature, as controlled variable, at the end of the length of piping constituting the spray-drier unit (7).

8. The method according to claim 7, wherein the volumetric flow rate of the stream(s) of air or inert gas is controlled by measuring the temperature, as controlled variable, at the end of the length of piping constituting the spray-drier unit (7).

9. The method according to claim 6, wherein spray-drying is only continued long enough to concentrate the dispersion but not to dry it.

10. The method according to claim 6, wherein spray-drying is continued until the dispersion is, for the most part, completely dry.

11. The method according to claim 6, wherein the solvent (2) and nonsolvent (3) are selected such that the solvent (2) has the higher saturation pressure.

12. The method according to claim 6, wherein solvent-saturated gas is separated from the dispersion being formed.

* * * * *